US012020489B2

(12) United States Patent
Park et al.

(10) Patent No.: US 12,020,489 B2
(45) Date of Patent: Jun. 25, 2024

(54) NETWORK ARCHITECTURE FOR MONOCULAR DEPTH ESTIMATION AND OBJECT DETECTION

(71) Applicant: Toyota Research Institute, Inc., Los Altos, CA (US)

(72) Inventors: Dennis Park, Fremont, CA (US); Rares A. Ambrus, San Francisco, CA (US); Vitor Guizilini, Santa Clara, CA (US); Jie Li, Los Altos, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 529 days.

(21) Appl. No.: 17/333,537

(22) Filed: May 28, 2021

(65) Prior Publication Data

US 2022/0301202 A1 Sep. 22, 2022

Related U.S. Application Data

(60) Provisional application No. 63/161,735, filed on Mar. 16, 2021.

(51) Int. Cl.
*G06V 20/58* (2022.01)
*G01S 17/42* (2006.01)
(Continued)

(52) U.S. Cl.
CPC .............. *G06V 20/58* (2022.01); *G01S 17/42* (2013.01); *G01S 17/89* (2013.01); *G01S 17/931* (2020.01);
(Continued)

(58) Field of Classification Search
None
See application file for complete search history.

(56) References Cited

U.S. PATENT DOCUMENTS

| 2020/0134831 A1 | 4/2020 | Chen et al. |
| 2020/0160559 A1 | 5/2020 | Urtasun et al. |
| (Continued) | | |

FOREIGN PATENT DOCUMENTS

WO 2020069049 A1 4/2020

OTHER PUBLICATIONS

Simonelli et al. "Demystifying Pseudo-LiDAR for Monocular 3d Object Detection", Dec. 10, 202, pp. 1-17, arXiv:2012.05796v1 [cs.CV] Dec. 10, 2020.

(Continued)

*Primary Examiner* — Leon Viet Q Nguyen
(74) *Attorney, Agent, or Firm* — Christopher G. Darrow; Darrow Mustafa PC

(57) ABSTRACT

Systems, methods, and other embodiments described herein relate to performing depth estimation and object detection using a common network architecture. In one embodiment, a method includes generating, using a backbone of a combined network, a feature map at multiple scales from an input image. The method includes decoding, using a top-down pathway of the combined network, the feature map to provide features at the multiple scales. The method includes generating, using a head of the combined network, a depth map from the features for a scene depicted in the input image, and bounding boxes identifying objects in the input image.

13 Claims, 5 Drawing Sheets

(51) Int. Cl.

| | |
|---|---|
| *G01S 17/89* | (2020.01) |
| *G01S 17/931* | (2020.01) |
| *G06F 18/21* | (2023.01) |
| *G06F 18/2113* | (2023.01) |
| *G06F 18/214* | (2023.01) |
| *G06F 18/25* | (2023.01) |
| *G06N 3/04* | (2023.01) |
| *G06N 3/08* | (2023.01) |
| *G06N 20/00* | (2019.01) |
| *G06T 7/10* | (2017.01) |
| *G06T 7/11* | (2017.01) |
| *G06T 7/50* | (2017.01) |
| *G06V 10/46* | (2022.01) |
| *G06V 10/75* | (2022.01) |
| *G06V 20/56* | (2022.01) |

(52) U.S. Cl.
CPC ...... *G06F 18/2113* (2023.01); *G06F 18/2155* (2023.01); *G06F 18/217* (2023.01); *G06F 18/251* (2023.01); *G06N 3/04* (2013.01); *G06N 3/08* (2013.01); *G06N 20/00* (2019.01); *G06T 7/10* (2017.01); *G06T 7/11* (2017.01); *G06T 7/50* (2017.01); *G06V 10/462* (2022.01); *G06V 10/757* (2022.01); *G06V 20/56* (2022.01); *G06T 2207/10024* (2013.01); *G06T 2207/10028* (2013.01); *G06T 2207/20016* (2013.01); *G06T 2207/20081* (2013.01); *G06T 2207/20084* (2013.01); *G06T 2207/30248* (2013.01)

(56) References Cited

U.S. PATENT DOCUMENTS

| | | | | |
|---|---|---|---|---|
| 2020/0167943 | A1* | 5/2020 | Kim | G06T 7/579 |
| 2020/0218979 | A1* | 7/2020 | Kwon | G06F 18/2155 |
| 2021/0209797 | A1* | 7/2021 | Lee | G06T 17/00 |
| 2021/0407125 | A1* | 12/2021 | Mahendran | G06T 19/006 |

OTHER PUBLICATIONS

Weng et al. "Monocular 3D Object Detection with Pseudo-LiDAR Point Cloud" In Proceedings of the IEEE/CVF International Conference on Computer VisionWorkshops, 2019, pp. 1-30.

You et al. "Pseudo-LiDAR++: Accurate Depth for 3D Object Detection in Autonomous Driving", Feb. 15, 2020, pp. 1-22, published as a conference paper at ICLR 2020.

Ma et al. "Rethinking Pseudo-LiDAR Representation" In European Conference on Computer Vision, pp. 1-21 arXiv:2008.04582v1 [cs.CV] Aug. 11, 2020.

Zhou et al. "Objects as points" Apr. 25, 2019, pp. 1-12, arXiv:1904.07850v2 [cs.CV] Apr. 25, 2019.

Tian et al. "FCOS: Fully Convolutional One-Stage Object Detection" In Proceedings of the IEEE/CVF International Conference on Computer Vision, 2019, pp. 9627-9636.

Simonelli et al. "Disentangling Monocular 3D Object Detection" In Proceedings of the IEEE/CVF International Conference on Computer Vision, pp. 1991-1999. 2019.

Waltner et al. "Deep 2.5D Vehicle Classification with Sparse SfM Depth Prior for Automated Toll Systems" May 11, 2018, pp. 1-6, arXiv:1805.03511v2 [cs.CV] May 11, 2018.

Ranftl et al. "Towards Robust Monocular Depth Estimation: Mixing Datasets for Zeroshot Cross-dataset Transfer" Aug. 25, 2020, pp. 1-14, arXiv:1907.01341v3 [cs.CV] Aug. 25, 2020.

Zhan et al., "GMLight: Lighting Estimation via Geometric Distribution Approximation," International Journal of Computer Vision, Feb. 20, 2021, pp. 1-12, arXiv:2102.10244v1 [cs.CV] Feb. 20, 2021.

Zhou et al., "IAFA: Instance-Aware Feature Aggregation for 3D Object Detection from a Single Image," Proceedings of the Asian Conference on Computer Vision, 2020, pp. 1-18, SpringerLink: https://link.springer.com'conference/accv.

Cho et al., "A Large RGB-D Dataset for Semi-supervised Monocular Depth Estimation," IEEE Transactions on Image Processing, Apr. 23, 2019, pp. 1-13, arXiv:1904.10230v1 [cs.CV] Apr. 23, 2019.

Hu et al., "Exploring Hypergraph Representation on Face Anti-spoofing Beyond 2D Attacks," Dec. 13, 2018, pp. 1-10, arXiv:1811.11594v2 [cs.CV] Dec. 13, 2018.

Schuster et al., "Dense Scene Flow from Stereo Disparity and Optical Flow," Aug. 30, 2018, pp. 1-3, arXiv:1808.10146v1 [cs.CV] Aug. 30, 2018.

Zhou et al., "Stereo Magnification: Learning View Synthesis Using Multiplane Images" arXiv:1805.09817v1 [cs.CV] May 24, 2018.

Xu et al. "Multi-level Fusion Based 3D Object Detection from Monocular Images" In Proceedings of the IEEE conference on computer vision and pattern recognition, pp. 2345-2353, 2018.

Wang et al. "Train in Germany, Test in the USA: Making 3D Object Detectors Generalize" In Proceedings of the IEEE/CVF Conference on Computer Vision and Pattern Recognition, pp. 11713-11723, 2020.

Vijayanarasimhan et al. "SfM-Net: Learning of Structure and Motion from Video." arXiv:1704.07804v1 [cs.CV] Apr. 25, 2017.

Vianney et al. "RefinedMPL: Refined Monocular PseudoLiDAR for 3d Object Detection in Autonomous Driving" arXiv preprint pp. 1-10 arXiv:1911.09712v1 [cs.CV] Nov. 21, 2019.

Ummenhofer et al. "DeMoN: Depth and Motion Network for Learning Monocular Stereo" In IEEE Conference on computer vision and pattern recognition (CVPR), vol. 5, p. 6, 2017.

Laina et al. "Deeper Depth Prediction With Fully Convolutional Residual Networks" In International Conference on 3D Vision (3DV), pp. 239-248, arXiv:1606.00373v2 [cs.CV] Sep. 19, 2016.

Qin et al. "MonoGRNet: A Geometric Reasoning Network for Monocular 3d Object Localization" In Proceedings of the AAAI Conference on Artificial Intelligence, vol. 33, pp. 8851-8858, 2019.

Qian et al. "End-to-End Pseudo-LiDAR for Image-Based 3D Object Detection" In Proceedings of the IEEE/CVF Conference on Computer Vision and Pattern Recognition, pp. 5881-5890, 2020.

Qi et al. "Geonet: Geometric Neural Network for Joint Depth and Surface Normal Estimation" In International Conference on Computer Vision and Pattern Recognition (CVPR), pp. 283-291, 2018.

Klingner et al. "Self-Supervised Monocular Depth Estimation: Solving the Dynamic Object Problem by Semantic Guidance" arXiv preprint arXiv:2007.06936v2 [cs.CV] Jul. 21, 2020.

Barabanau et al. "Monocular 3d Object Detection Via Geometric Reasoning on Keypoints" arXiv:1905.05618v1 [cs.CV] May 14, 2019.

Beker et al. Monocular Differentiable Rendering for Self-Supervised 3d Object Detection, arXiv:2009.14524v1 [cs.CV] Sep. 30, 2020.

Kehl ett al. "SSD-6d: Making RGB-Based 3D Detection and 6D Pose Estimation Great Again" in Proceedings of the IEEE international conference on computer vision, pp. 1521-1529, 2017.

Brazil et al. "Kinematic 3d object detection in monocular video" In European Conference on Computer Vision, pp. 135-152. Springer, arXiv:2007.09548v1 [cs.CV] Jul. 19, 2020.

Jorgensen et al. "Monocular 3d Object Detection and Box Fitting Trained End-to-End Using Intersection-Over-Union Loss" arXiv preprint arXiv:1906.08070v2 [cs.CV] Jun. 20, 2019.

Hu et al. "Squeeze-and-Excitation Networks" In Proceedings of the IEEE conference on computer vision and pattern recognition, pp. 7132-7141, 2018.

Chen et al. "Monocular 3d Object Detection Using Pairwise Spatial Relationships" In Proceedings of the IEEE/CVF Conference on Computer Vision and Pattern Recognition, pp. 12093-12102, 2020.

Deng et al. "Imagenet: A Large-Scale Hierarchical Imagedatabase" In 2009 IEEE conference on computer vision and pattern recognition, pp. 248-255. IEEE, 2009.

He et al. "Deep Residual Learning for Image Recognition" In Proceedings of the IEEE conference on computer vision and pattern recognition, pp. 770-778, 2016.

(56) References Cited

OTHER PUBLICATIONS

Eigen et al. "Depth Map Prediction from a Single Image Using a Multi-Scale Deep Network" In Advances in neural information processing systems, pp. 2366-2374, arXiv:1406.2283v1 [cs.CV] Jun. 9, 2014.
Fu et al. "Deep Ordinal Regression Network for Monocular Depth Estimation" In International Conference on Computer Vision and Pattern Recognition (CVPR), pp. 2002-2011, 2018.
Gahlertet al. "Cityscapes 3D: Dataset and Benchmark for 9 DoF Vehicle Detection" arXiv:2006.07864v1 [cs.CV] Jun. 14, 2020.
Geiger et al. "Vision Meets Robotics: The Kitti Dataset" The International Journal of Robotics Research, 32(11) pp. 1231-1237, 2013.
Guizilini et al. "Semantically-Guided Representation Learning for Self-Supervised Monocular Depth" In International Conference on Learning Representations (ICLR), arXiv:2002.12319v1 [cs.CV] Feb. 27, 2020.
Guizilini et al. "3D Packing for Self-Supervised Monocular Depth Estimation" In IEEE Conference on Computer Vision and Pattern Recognition (CVPR), pp. 2485-2494 2020.
Lee et al. "From Big to Small: Multi-Scale Local Planar Guidance for Monocular Depth Estimation" arXiv preprint arXiv:1907.10326, 2019.
Lee et al. "Centermask: Real-time Anchor-Free Instance Segmentation" arXiv:1911.06667v6 [cs.CV] Apr. 2, 2020.
Lin et al. "Microsoft COCO: Common Objects in Context" In European conference on computer vision, pp. 740-755. Springer, 2014.
Ma et al. "Accurate Monocular 3D Object Detection Via Color-Embedded 3D Reconstruction for Autonomous Driving" In Proceedings of the IEEE/CVF International Conference on Computer Vision, pp. 6851-6860, 2019.
Manhardt et al. "ROI-10D: Monocular Lifting of 2D Detection to 6D Pose and Metric Shape" In Proceedings of the IEEE/CVF Conference on Computer Vision and Pattern Recognition, pp. 2069-2078, 2019.
Mousavian et al. "3D Bounding Box Estimation Using Deep Learning and Geometry" In Proceedings of the IEEE Conference on Computer Vision and Pattern Recognition, pp. 7074-7082, 2017.
Pillai et al. "Superdepth: Self-Supervised, Super-Resolved Monocular Depth Estimation" in arXiv:1810.01849v1 [cs.CV] Oct. 3, 2018.
Lin et al., "Feature Pyramid Networks for Object Detection", In CVPR, 2017. 3.
Godard et al., "Digging into self-supervised monocular depth estimation" in arXiv preprint arXiv:1806.01260v3, 2018.

\* cited by examiner

NETWORK ARCHITECTURE FOR MONOCULAR DEPTH ESTIMATION AND OBJECT DETECTION

CROSS-REFERENCE TO RELATED APPLICATIONS

This application claims benefit of U.S. Provisional Application No. 63/161,735, filed on, Mar. 16, 2021, which is herein incorporated by reference in its entirety.

TECHNICAL FIELD

The subject matter described herein relates, in general, to systems and methods for predicting depth and detecting objects, and, more particularly, to a unique network architecture that performs depth prediction and object detection.

BACKGROUND

Various devices that operate autonomously or that provide information about a surrounding environment often use sensors that facilitate perceiving obstacles and additional aspects of the surrounding environment. The ability to reconstruct the structure of a scene with high accuracy is important for understanding and navigation of the scene. As one example, a robotic device uses information from the sensors to develop awareness of the surrounding environment in order to navigate through the environment and avoid hazards. In particular, the robotic device uses the perceived information to determine a 3-D structure of the environment so that the device may distinguish between navigable regions and potential hazards. In various aspects, this can include perceiving distances and detecting discrete objects.

In one approach, the robotic device may employ monocular cameras to capture images of the surrounding environment from which distances and other aspects can be estimated. While this approach can avoid the use of expensive light detection and ranging (LiDAR) sensors, the resulting estimates do not always provide the level of accuracy that may be necessary to navigate the scene. Moreover, this approach may further necessitate multiple different machine learning models, the training of which can represent a difficult task due to the difficulty of acquiring training data.

SUMMARY

Example systems and methods relate to an improved approach to depth estimation and object detection from monocular images that leverages a combined network. As previously noted, implementing multiple separate networks to perform depth estimation and object detection can be resource-intensive. Moreover, the process of independently training these networks can also be difficult, especially for the object detection network, which may use labeled ground-truth data that is often difficult to acquire.

Therefore, in one arrangement, a combined network is disclosed that integrates both functions into a single network while leveraging the simplicity in the training of the depth estimation network to improve the training of the network on object detection. For example, the combined network is formed from a common backbone that accepts monocular images as input and generates feature maps at different scales to encode features represented in the image. The feature maps are fed into a top-down pathway that, in one arrangement, functions to decode the feature maps in features, which may also involve using lateral connections between the backbone to further enhance the feature generation. Accordingly, a shared head is then used among the separate scales to generate bounding boxes for object detections and, at a highest resolution, also generate a depth map for the input image.

In any case, the backbone and top-down pathway generally form a feature pyramid network that is shared among the different tasks of depth estimation and object detection. Thus, instead of training the combined network at separate instances for object detection and depth estimation, an initial training on depth estimation can be performed to train the backbone and the top-down pathway. Subsequently, the combined network trains on object detection using training data that can be less extensive. Thus, the pre-training on depth estimation initializes the combined network such that training on object detection is not as intensive a task as would otherwise be needed and uses fewer labeled training images, thereby reducing the difficulty of acquiring such data for training. In this way, the combined network improves overall functioning for both tasks using a simplified architecture that is simpler to train.

In one embodiment, a depth system is disclosed. The depth system includes one or more processors and a memory communicably coupled to the one or more processors. The memory stores a network module including instructions that, when executed by the one or more processors, cause the one or more processors to generate, using a backbone of a combined network, a feature map at multiple scales from an input image. The network module includes instructions to decode, using a top-down pathway of the combined network, the feature map to provide features at the multiple scales. The network module includes instructions to generate, using a head of the combined network, a depth map from the features for a scene depicted in the input image and bounding boxes identifying objects in the input image.

In one embodiment, a non-transitory computer-readable medium including instructions that, when executed by one or more processors, cause the one or more processors to perform various functions is disclosed. The instructions include instructions to generate, using a backbone of a combined network, a feature map at multiple scales from an input image. The instructions include instructions to decode, using a top-down pathway of the combined network, the feature map to provide features at the multiple scales. The instructions include instructions to generate, using a head of the combined network, a depth map from the features for a scene depicted in the input image and bounding boxes identifying objects in the input image.

In one embodiment, a method is disclosed. The method includes generating, using a backbone of a combined network, a feature map at multiple scales from an input image. The method includes decoding, using a top-down pathway of the combined network, the feature map to provide features at the multiple scales. The method includes generating, using a head of the combined network, a depth map from the features for a scene depicted in the input image and bounding boxes identifying objects in the input image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with an improved approach to depth estimation and object detection from monocular images that leverages a combined network are disclosed. As previously noted, implementing multiple separate networks to perform depth estimation and object detection can be resource-intensive. Moreover, the process of independently training these networks can also be difficult, especially for the object detection network, which may use labeled ground-truth data that is often difficult to acquire.

Therefore, in one arrangement, a combined network is disclosed that integrates both functions into a single network while leveraging the simplicity in training of the depth estimation network to improve training of the network on object detection. For example, the combined network is formed from a common backbone that accepts monocular images as input and generates feature maps at different scales to encode features represented in the image. The feature maps are fed into a top-down pathway that, in one arrangement, functions to decode the feature maps in features, which may also involve using lateral connections between the backbone to further enhance the feature generation. Accordingly, a shared head is then used among the separate scales to generate bounding boxes for object detections and, at a highest resolution, also generate a depth map for the input image.

In any case, the backbone and top-down pathway generally form a feature pyramid network that is shared among the different tasks of depth estimation and object detection. Thus, instead of training the combined network at separate instances for object detection and depth estimation, an initial training on depth estimation can be performed to train the backbone and the top-down pathway. Subsequently, the combined network trains on object detection using training data that can be less extensive. Thus, the pre-training on depth estimation initializes the combined network such that training on object detection is not as intensive a task as would otherwise be needed and uses fewer labeled training images, thereby reducing the difficulty of acquiring such data for training. In this way, the combined network improves overall functioning for both tasks using a simplified architecture that is simpler to train.

Figure 1:
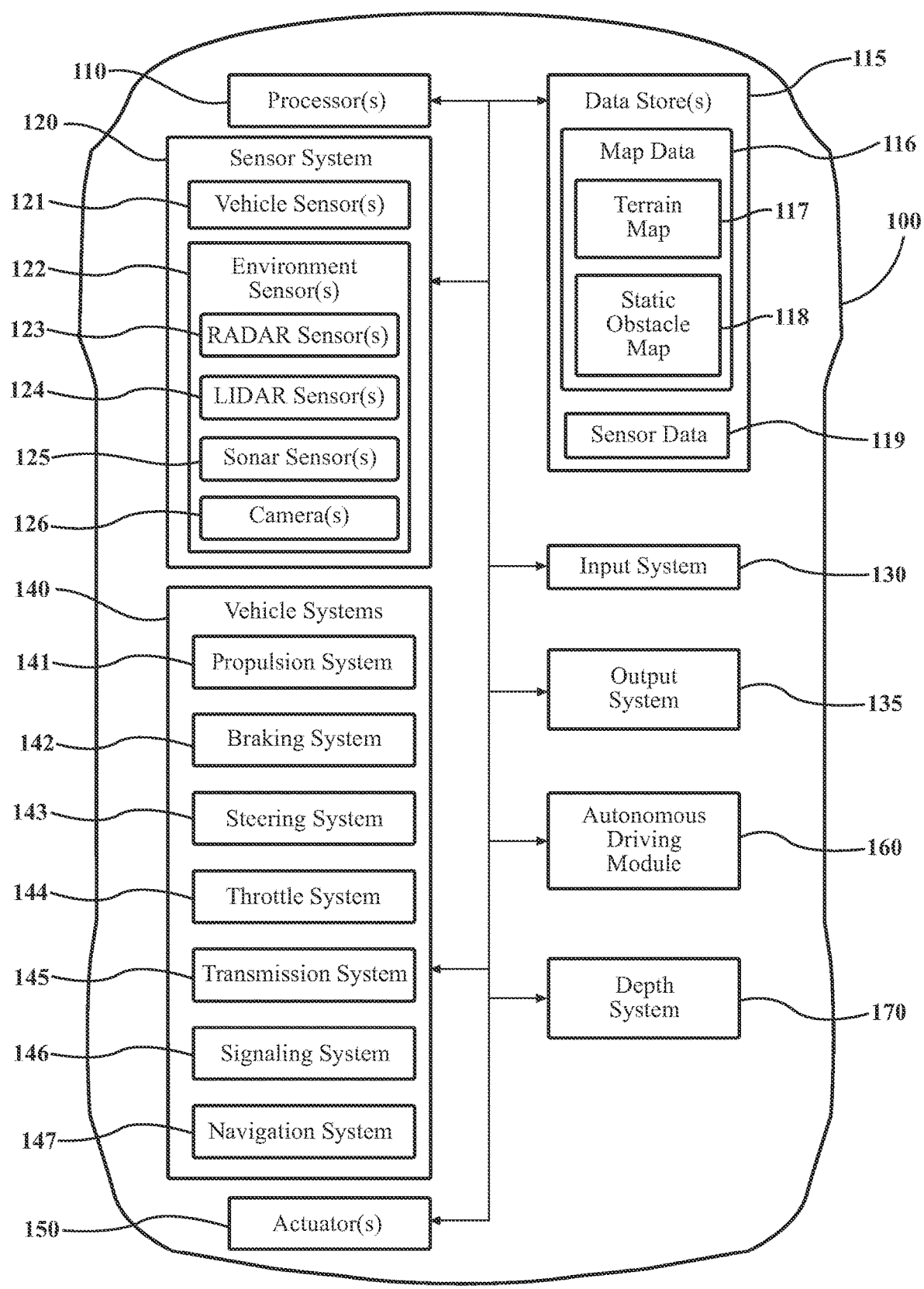
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or another device (e.g., surveillance device) that, for example, observes surroundings to provide determinations therefrom, and thus benefits from the functionality discussed herein. In yet further embodiments, the vehicle 100 may be a statically mounted device, an embedded device, or another device that uses monocular images to derive depth and object information about a scene instead of being a motive device.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a depth system 170 that functions to generate depth estimates (i.e., depth maps) using a novel network architecture that can employ multiple sources of information. Moreover, while depicted as a standalone component, in one or more embodiments, the depth system 170 is integrated with the autonomous driving module 160, the camera 126, or another component of the vehicle 100. Additionally, as noted previously, one or more components of the depth system 170 may be cloud-based elements that are remote from the vehicle 100. The noted functions and methods will become more apparent with a further discussion of the figures.

Figure 2:
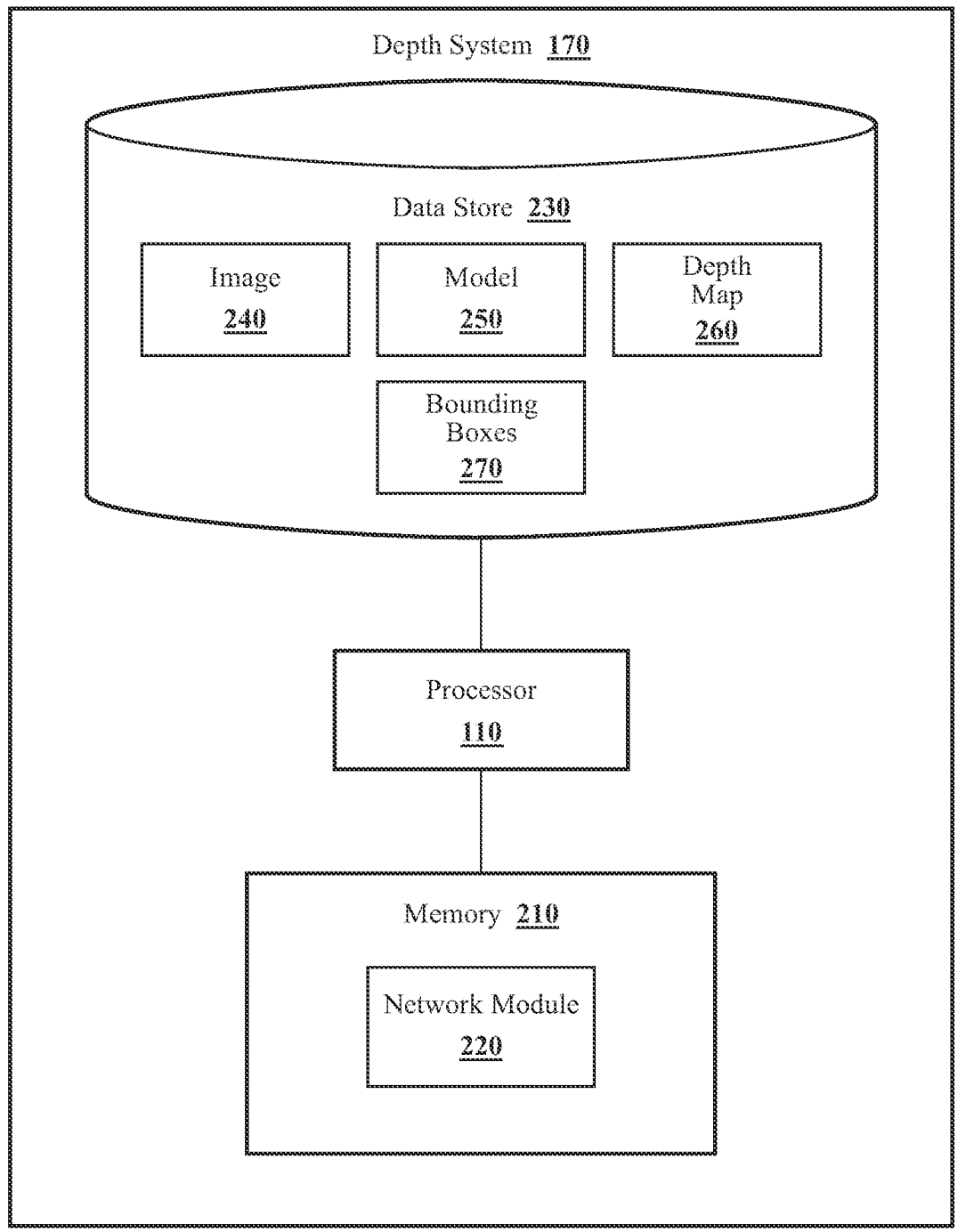
FIG. 2 illustrates one embodiment of a depth system that is associated with providing depth estimates and bounding boxes for object detection using a combined network.

With reference to FIG. 2, one embodiment of the depth system 170 is further illustrated. The depth system 170 is shown as including a processor 110. Accordingly, the processor 110 may be a part of the depth system 170, or the depth system 170 may access the processor 110 through a data bus or another communication path. In one or more embodiments, the processor 110 is an application-specific integrated circuit (ASIC) that is configured to implement functions associated with a network module 220. In general, the processor 110 is an electronic processor, such as a microprocessor that is capable of performing various functions as described herein. In one embodiment, the depth system 170 includes a memory 210 that stores the network module 220 and/or other modules that may function in support of generating depth information. The memory 210 is a random-access memory (RAM), read-only memory (ROM), a hard disk drive, a flash memory, or other suitable memory for storing the network module 220. The network module 220 is, for example, computer-readable instructions that, when executed by the processor 110, cause the processor 110 to perform the various functions disclosed herein. In further arrangements, the network module 220 is a logic, integrated circuit, or another device for performing the noted functions that includes the instructions integrated therein.

Furthermore, in one embodiment, the depth system 170 includes a data store 230. The data store 230 is, in one embodiment, an electronic data structure stored in the memory 210 or another data store, and that is configured with routines that can be executed by the processor 110 for analyzing stored data, providing stored data, organizing stored data, and so on. Thus, in one embodiment, the data store 230 stores data used by the network module 220 in executing various functions. For example, as depicted in FIG. 2, the data store 230 includes an image 240, a model 250 that is the combined network, a depth map 260, and bounding boxes 270 along with, for example, other information that is used and/or produced by the network module 220.

The image 240 is, for example, a monocular image from the camera 126 or another imaging device. The monocular image is generally derived from one or more monocular videos that are comprised of a plurality of frames although the image 240 may also be derived from a still image camera. As described herein, monocular images are, for example, images from the camera 126 or another imaging device that are red-green-blue (RGB) images without any further modality, and that encompass a field-of-view (FOV) about the vehicle 100 of at least a portion of the surrounding environment. That is, the monocular image 240 is, in one approach, generally limited to a subregion of the surrounding environment. As such, the image 240 may be a forward-facing direction (i.e., the direction of travel) 60, 90, 120-degree FOV, a rear/side facing FOV, or some other subregion as defined by the imaging characteristics (e.g., lens distortion, FOV, etc.) of the camera 126. In various aspects, the camera 126 is a pinhole camera, a fisheye camera, a catadioptric camera, or another form of camera that acquires images without a specific depth modality.

An individual monocular image itself includes visual data of the FOV that is encoded according to an imaging standard (e.g., codec) associated with the camera 126 or another imaging device that is the source. In general, characteristics of a source camera (e.g., camera 126) and the video standard define a format of the monocular image. Thus, while the particular characteristics can vary according to different implementations, in general, the image has a defined resolution (i.e., height and width in pixels) and format. Thus, for example, the monocular image is an RGB visible light image. In further aspects, the monocular image can be an infrared image associated with a corresponding infrared camera, a black/white image, or another suitable format as may be desired. Whichever format that the depth system 170 implements, the image is a monocular image in that there is no explicit additional modality indicating depth nor any explicit corresponding image from another camera from which the depth can be derived (i.e., no stereo camera pair). In contrast to a stereo image that may integrate left and right images from separate cameras mounted side-by-side to provide an additional depth channel, the monocular image does not include explicit depth information, such as disparity maps derived from comparing the stereo images pixel-by-pixel. Instead, the monocular image implicitly provides depth information in the relationships of perspective and size of elements depicted therein from which the model 250 derives the depth map 260.

Additionally, in one or more arrangements, that data store 230 further includes training data that corresponds to the image 240. As a general aspect, it should be noted that while the image 240 and the training data are discussed in the singular form, the data store 230, in various arrangements, includes a multiplicity of images and corresponding training data in order to support training of the model 250. Moreover, during actual use, the system 170 may acquire and process the image 240 individually. In any case, the training data associated with the image 240 includes, in one embodiment, ground-truth depth data, ground-truth bounding boxes, class labels, and so on. Of course, in further implementations, one or more aspects of the training data may be omitted, such as when the depth system 170 implements a self-supervised approach to training the model 250 on depth. In the case of self-supervised training on depth, the training data may not include the ground-truth depth data but instead includes sequences of images from a video of a same scene in order to support determinations through the use of structure-from-motion (SfM).

The model 250 is a combined network that supports inferences about depth, object detection, and classification. In one configuration, the model 250 is a fully convolutional network that is a single stage. Further, the model 250 may be referred to as a feature pyramid network (FPN) that includes a bottom-up backbone for encoding feature maps from the image 240, a top-down pathway that decodes the feature maps, and a shared head. The top-down pathway, which is also referred to as the feature pyramid in some implementations, includes lateral connections at different scales with the backbone in addition to serial connections between separate layers. Thus, the top-down pathway outputs results at different scales (e.g., bounding boxes, centerness, etc.) except for the depth map 260, which is output at the highest resolution.

Figure 3:
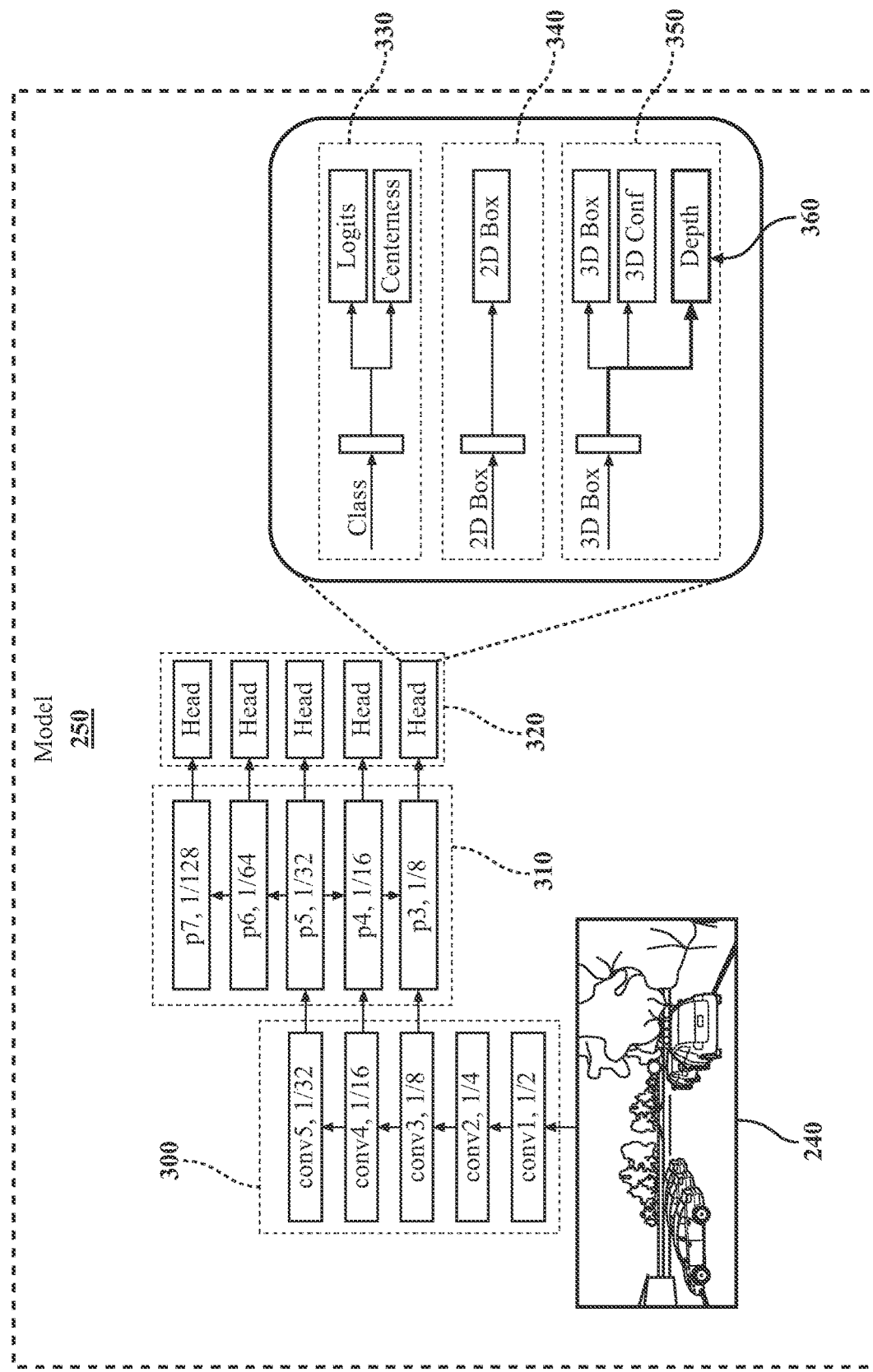
FIG. 3 illustrates one arrangement of an architecture for the combined network.

As a further explanation of the architecture for the model 250, consider FIG. 3. As shown in FIG. 3, the model 250 includes a backbone 300 that includes a series of convolutional layers that iteratively reduce a scale of the image 240 that is the input. The backbone 300, which may also be referred to as the bottom-up pathway, is the feed-forward computation of the model 250 that computes a feature hierarchy, including feature maps at multiple different scales. In further aspects, the backbone 300 may include additional components, such as pooling layers, and so on. The top-down pathway 310, in one approach, hallucinates higher-resolution features by up-sampling spatially coarser feature maps using a series of deconvolutional layers. The top-down pathway 310 enhances the features via lateral connections with the backbone 300 to provide fewer sampled instances of the original input 240 for improved up-sampling, as shown.

The lateral connections merge feature maps of the same spatial size from the backbone 300 and the top-down pathway 310, thereby providing more accurate localizations since the feature map from the backbone 300 is sub-sampled fewer times than the feature map from a previous layer of the top-down pathway 310. The depth system 170 may use an element-wise addition to combine the separate maps. The head 320 is shared among the separate output scales of the top-down pathway 310 but is shown as multiple different heads to emphasize the inference at the separate scales. That is, the head 320 is a single structure that is shared among the separate outputs of the top-down pathway 310.

As illustrated, the head 320 includes multiple different structures, such as a class component 330, a two-dimensional component 340, and a three-dimensional component 350. The class component 330 generates a vector of C dimensions corresponding to a number of classes on which the model 250 is trained. The class component 330 may include a multi-class classifier or a plurality of binary classifiers to generate class determinations for objects.

The 2D component 340 functions to identify objects in 2D space of the frame of the image 240. In one approach, the 2D component 340 is a convolutional network that generates 2D bounding boxes as identifications from the frame of the image 240. The 2D component 340 can function to provide consistency between 2D and 3D object detections.

The head 320 further includes a depth component 360 that acts as a pseudo-LiDAR 3D detector for predicting dense per-pixel depth, which is converted to a 3D point cloud using camera intrinsics. The 3D component 350 concatenates the point cloud with the input image 240 to produce a six-dimensional tensor encompassing pixel color values along with 3D coordinates as the depth map 260. The 3D component 350 further accepts proposal regions from the 2D component 340 and processed by a 3D detection network 370 that generates the bounding boxes 270.

Returning to FIG. 2, the network module 220 generally implements the model 250 as being a separate component. In various aspects, the network module 220 includes instructions to apply the model 250, and the model 250 may be integrated with the network module 220. In general, the network module 220 controls the model 250 to process the sensor data, which includes the image 240, and, when training, uses associated training data to generate a training loss to update the model 250.

In any case, the depth system 170, in one embodiment, employs the model 250 to produce the depth map 260, the bounding boxes 270, and further information (e.g., 2D bounding boxes, classifications, etc.). In general, the depth map 260 is a pixel-wise prediction of depths for the image 240, which may be referred to as pseudo-LiDAR depth data or dense depth data. That is, the model 250 provides estimates of depths for different aspects depicted in the image 240. Of course, in the present approach, the model 250 further integrates information from beyond the depth map 260 to provide object detections in the form of 2D and 3D bounding boxes 270 in addition to other information, such as classifications from the single model 250.

It should be appreciated that, in one embodiment, the network module 220 generally includes instructions that function to control the processor 110 to execute various actions to control the model 250 to produce the depth map 260. The network module 220, in one or more approaches, acquires the image 240 by, for example, controlling the camera 126 or acquires the image 240 from a data bus, or electronic memory, or another available electronic source. Of course, in the instance of training the model 250, the network module 220 may further acquire training data (e.g., ground-truth depth, object bounding boxes, class information, etc.) from an electronic memory or another suitable data store.

The network module 220 initially applies the backbone 300 of the model 250 to the input image 240 to generate a feature map at multiple different scales (i.e., a feature hierarchy). Thus, the network module 220 is generating multiple feature maps with, for example, each having a different scale that abstracts features of the different scales (e.g., large versus smaller features, such as a dog versus a truck). The model 250 then feeds the feature map to the top-down pathway 310 using two different connections. The first is the serial connection from the final layer of the backbone 300, while the second is the lateral connections, which are sometimes referred to as skip connections, that provide the different scale feature maps. In this way, the network module 220 facilitates multiple levels of features into the top-down pathway 310 to facilitate decoding.

The network module 220 performs the decoding using the top-down pathway 310 to provide features, or generated feature maps with greater detail, to a shared head 330 of the model 250. The shared head 320 generates the depth map 260 from the features for a scene depicted in the input image and bounding boxes 270 identifying objects in the input image 240. As previously illustrated, the shared head 320 includes multiple different pathways that are associated with different functions. For example, the head 320 includes multiple sub-heads that perform 3D object detection, 2D object detection, depth estimation, and classification. The network module 220 controls the separate heads 320 to operate on the features from the top-down pathway 310. Thus, the network module 220 may control the head 320 to iteratively process the different scales of features provided as outputs from the top-down pathway 310, while further controlling the depth component 360 to operate on, for example, the highest resolution feature map without generating depth for the other scales.

In general, the framework of the model 250 shares many aspects among multiple different components, such as the backbone 300, and the top-down pathway 310. The particular sections of the head 320 all use the backbone 300 and the top-down pathway 310, while the components of the head 320 include separate individual components to facilitate generating the different outputs. By sharing a significant portion of the model 250, the depth system 170 can train the model 250 on a task that is less resource-dependent, such as depth estimation, in order to initialize the model 250 and use less ground-truth data associated with the particular separate tasks to achieve convergence in the model 250.

Accordingly, in one aspect, the network module 220 implements a two-stage training process. In the first stage, the network module 220 trains the model 250 using losses derived from the depth estimates (i.e., the depth map 260) over many iterations. The first stage of training may use ground-truth depth data in a supervised training pipeline, may rely on intrinsic ground truths through a self-supervised monocular approach that uses a series of images from a video taken on a moving platform to facilitate structure-from-motion (SfM) analysis, or may rely on a combined training pipeline (e.g., semi-supervised that leverages sparse depth data in combination with intrinsic depth information of the self-supervised approach).

In any case, by using the depth component 360 as the source of the first stage training, the depth system 170 avoids difficulties with using excessive amounts of ground-truth training data for object detection and classification. Since the ground-truth data for the additional tasks is generally difficult to acquire in comparison to the depth training data because of costs and labor associated with generating the data, training in this way significantly improves the ability to accurately train the model 250 on the multiple different tasks. Thus, the network module 220 may randomly initialize the additional sub-heads 330 and 340 during the first stage and derive a depth loss according to training data for the depth head 360. The network module 220 can then use the depth loss in the first stage to adapt the backbone 300 and the top-down pathway 310 to train the model 250.

The network module 220 can then use a second training stage to refine the additional sub-heads 330, 340, and the 3D detection of head 350 on the additional tasks. Accordingly, in one aspect, the network module 220 uses ground-truth data for the particular tasks in the second stage to further refine the training of the model 250. However, it should be noted that the model 250 is already initialized and thus is expected to converge on accurate estimates for the different tasks using significantly less training data for the different tasks than would be used otherwise. Accordingly, by sharing a majority of the model 250 between the object detection, classification, and depth tasks, the simplicity of training on the depth estimation task improves the performance of the model 250 on the object detection and classification tasks.

Figure 4:
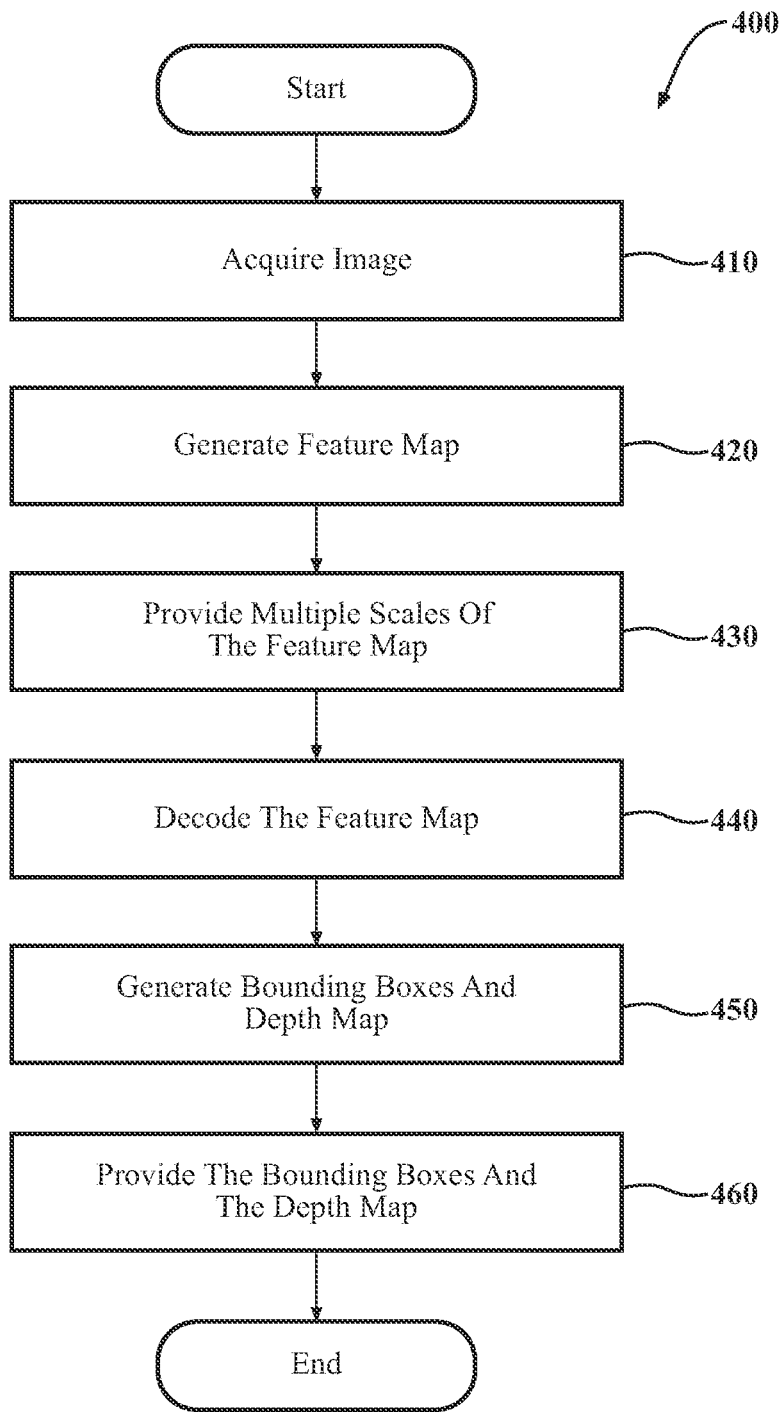
FIG. 4 illustrates a flowchart associated with one embodiment of generating a depth map and detecting objects within an image.

Additional aspects of the joint learning of depth prediction, object detection, and object classification will be discussed in relation to FIG. 4. FIG. 4 illustrates a flowchart of a method 400 that is associated with generating depth maps, bounding boxes, and classifications using a combined network. Method 400 will be discussed from the perspective of the depth system 170 of FIGS. 1-2. While method 400 is discussed in combination with the depth system 170, it should be appreciated that the method 400 is not limited to being implemented within the depth system 170 but is instead one example of a system that may implement the method 400.

At 410, the network module 220 acquires the image 240. In general, the image 240 is comprised of at least a monocular image from a monocular camera or video of a surrounding environment of the vehicle 100 or another device for which the depth system 170 is analyzing the information. Accordingly, as noted previously, the depth system 170 may be integrated with the vehicle 100 or another device or, alternatively, may receive the image 240 via a communication pathway, such as a wide area network (WAN), and function remotely to analyze the image 240. In any case, the depth system 170 can process the single image 240 to derive multiple different determinations using the same model 250.

At 420, the network module 220 generates, using the backbone 300 of the model 250, a feature map at multiple scales from an input image. Thus, the network module 220 uses the model 250 to generate the feature map at five different scales in one approach. The model 250 uses convolutional layers to process the input image 240 into the features maps that generally indicate the presence of features at the different scales. This feature hierarchy provides a representation of aspects depicted in the image 240 in an encoded form that the model 250 can process to identify objects, depths, and so on. Accordingly, the feature map encodes features of the input image 240 to provide a common reference for generating the depth map 260 and the bounding boxes 270.

At 430, the network module 220 provides, using lateral connections between the backbone 300 and the top-down pathway 310, the multiple scales of the feature map in addition to an output of a prior level from within the top-down pathway 310. Thus, while a portion of the model 250 functions to iteratively process the image 240 into feature maps and then process the features map according to successive iterations at successive scales, the network module 220 also provides the intermediate feature maps from the backbone 300 to the top-down pathway 310 using the lateral connections. This facilitates up-sampling at a higher resolution since feature maps provided via the lateral connections have not been sub-sampled as many times.

At 440, the network module 220 decodes, using the top-down pathway of the model 250, the feature map to provide features at the multiple scales. As noted previously, the top-down pathway 310 receives processed feature maps from prior layers while also receiving residual feature maps from the backbone via the lateral connections. In any case, the decoding generally includes applying deconvolutional layers to up-sample the inputs.

At 450, the network module 220 generates, using the shared head of the model 250, the depth map 260 from the features for a scene depicted in the input image 240 and the bounding boxes 270 identifying objects in the input image 240. In further aspects, the model 250 also generates 2D bounding boxes and classifications for identified objects. The network module 220 uses the head among separate layers of the top-down pathway at the multiple scales to generate the bounding boxes 270 at the multiple scales and the depth map 260 at one of the multiple scales. The head 320 includes multiple sub-heads that perform 3D object detection, 2D object detection, depth estimation, and classification. Thus, the network module 220 may use the model 250 to output multiple different determinations using the single model 250.

At 460, the network module 220 provides the depth map 260 and the bounding boxes 270. In one approach, the network module 220 provides the depth map 260 to an assistance system of the vehicle 100, such as the autonomous driving module 160 to cause navigation of the vehicle 100 (e.g., planning and control) according to the depth map 260 and the bounding boxes 270. Thus, the network module 220 can use the model 250 to assist with perceiving the surrounding environment of the vehicle 100 in order to facilitate path planning and other functions such that the vehicle 100 can safely navigate the environment.

Figure 5:
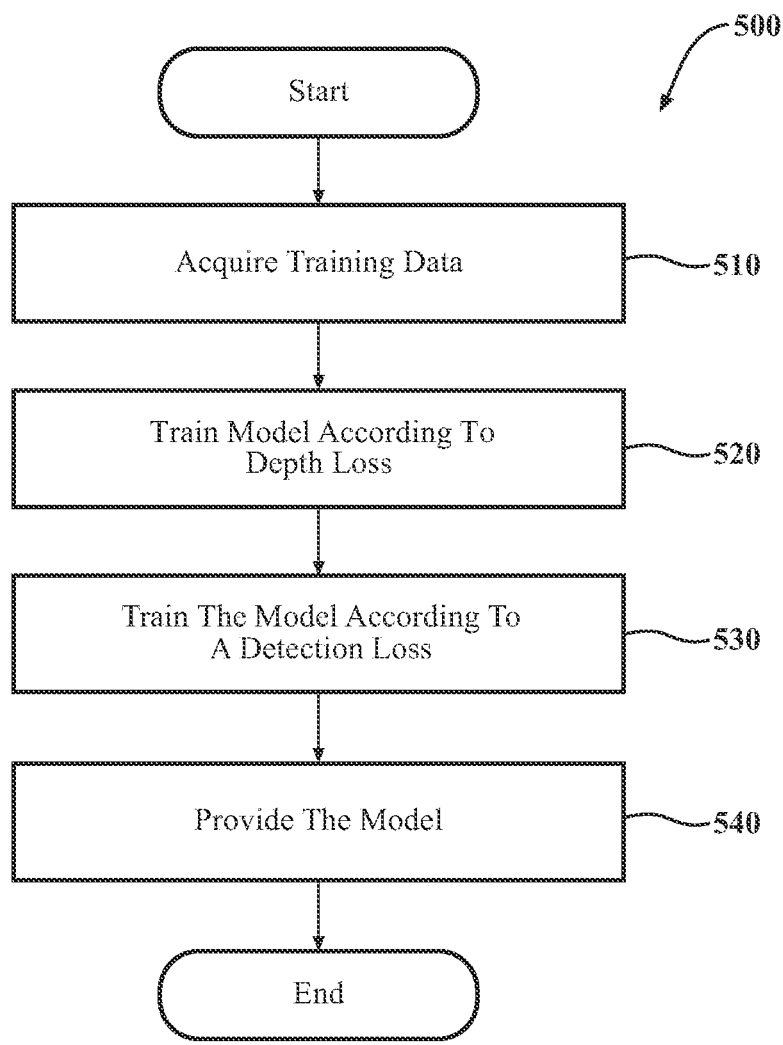
FIG. 5 illustrates a flowchart associated with one embodiment of training the combined network.

FIG. 5 illustrates a flowchart of a method 500 that is associated with training a combined network architecture. Method 500 will be discussed from the perspective of the depth system 170 of FIGS. 1-2. While method 500 is discussed in combination with the depth system 170, it should be appreciated that the method 500 is not limited to being implemented within the depth system 170 but is instead one example of a system that may implement the method 500.

At 510, the network module 220 acquires training data for training the model 250. In one approach, the training data includes data for two stages of training. Thus, the training data can include information for performing training on the depth head of the model 250. This training data can include a series of successive frames from a video of a scene to support self-supervised training. In a further approach, the self-supervised training data may be supplemented with sparse ground-truth depth data to support learning metrically accurate scale while still minimizing the need for ground-truth data. In yet a further approach, the depth training may rely on explicit ground-truth depth data derived from a LiDAR, stereo image pairs, and so on.

Moreover, the training data for the second stage generally includes labeled ground-truth data that supports the additional tasks of object detection and classification. The object classification ground truth data may include both 2D and 3D bounding boxes, while the classification data includes class labels for a number of classes on which the model 250 is trained. As previously outlined, the quantity of training data for the additional tasks is significantly reduced through the process of first training the model 250 on depth estimation as opposed to individually training on all of the tasks upfront.

At 520, the network module 220 trains, in a first stage, the model 250 a computed loss value associated with depth estimation. As noted, the depth training may be supervised or unsupervised depending on the available training data. In any case, the network module 220 trains the model 250 over a multiplicity of monocular images in the training data for the depth estimation task. During this first stage, the network module 220 may randomly initialize the other heads (i.e., classification and 2D bounding box estimation) while generally deriving the depth loss according to the depth map 260 and associated training data.

At 530, the network module 220 trains, in a second stage, the model 250 by using the bounding boxes and ground-truth data to compute a detection loss. In a further aspect, the network module 220 also trains the model 250 on classification in addition to 2D and 3D bounding box generation. In any case, the network module 220 performs the training of all other tasks after the initial depth estimation training in order to leverage the depth estimation training as a pre-training stage that initializes the shared components of the model 250, thereby hastening training for the other tasks on less robust data sets.

At 540, the network module 220 provides the model 250. After the network module 220 trains the model 250, the model 250 represents a single network architecture that can provide determinations for multiple different tasks. Consequently, the model 250 streamlines multiple separate tasks into a single architecture while also simplifying training. Thus, the model 250 is more efficient through sharing the common elements (e.g., backbone 300 and top-down pathway 310). In this way, the depth system 170 improves the determinations of depth, object detection, and classification.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected (i.e., communicably coupled) to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system, comprising:
one or more processors; and
a memory communicably coupled to the one or more processors and storing:
a network module including instructions that, when executed by the one or more processors, cause the one or more processors to:
generate, using a backbone of a combined network, a feature map at multiple scales from an input image;
decode, using a top-down pathway of the combined network, the feature map to provide features at the multiple scales;
generate, using a head of the combined network, a depth map from the features for a scene depicted in the input image and bounding boxes identifying objects in the input image, wherein the head includes multiple subheads for each of the multiple scales that perform 3D object detection, 2D object detection, depth estimation, and classification;
train, in a first stage, the combined network by using a supervised depth loss derived from the depth map; and
train, in a second stage, the combined network by using the bounding boxes and ground-truth data to compute a detection loss.

2. The depth system of claim 1, wherein the network module includes instructions to decode including instructions to provide, using lateral connections between the backbone and the top-down pathway, the multiple scales of the feature map in addition to an output of a prior level from within the top-down pathway.

3. The depth system of claim 1, wherein the network module includes instructions to generate the feature map including instructions to generate the feature map at the multiple scales as a feature hierarchy, and
wherein the network module includes instructions to generate the feature map to encode features of the input image to provide a common reference for generating the depth map and the bounding boxes.

4. The depth system of claim 1, wherein the network module includes instructions to generate the depth map and the bounding boxes including instructions to use the head among separate layers of the top-down pathway at the multiple scales to generate the bounding boxes at the multiple scales and the depth map at one of the multiple scales.

5. The depth system of claim 1, wherein the input image is a monocular image in RGB.

6. A non-transitory computer-readable medium including instructions that, when executed by one or more processors, cause the one or more processors to:
generate, using a backbone of a combined network, a feature map at multiple scales from an input image;
decode, using a top-down pathway of the combined network, the feature map to provide features at the multiple scales; and
generate, using a head of the combined network, a depth map from the features for a scene depicted in the input image and bounding boxes identifying objects in the input image, wherein the head includes multiple sub-heads for each of the multiple scales that perform 3D object detection, 2D object detection, depth estimation, and classification;
train, in a first stage, the combined network by using a supervised depth loss derived from the depth map; and
train, in a second stage, the combined network by using the bounding boxes and ground-truth data to compute a detection loss.

7. The non-transitory computer-readable medium of claim 6, wherein the instructions to decode include instructions to provide, using lateral connections between the backbone and the top-down pathway, the multiple scales of the feature map in addition to an output of a prior level from within the top-down pathway.

8. The non-transitory computer-readable medium of claim 6, wherein the instructions to generate the feature map including instructions to generate the feature map at the multiple scales as a feature hierarchy, and
wherein the instructions to generate the feature map encode features of the input image to provide a common reference for generating the depth map and the bounding boxes.

9. A method, comprising:
generating, using a backbone of a combined network, a feature map at multiple scales from an input image;
decoding, using a top-down pathway of the combined network, the feature map to provide features at the multiple scales; and
generating, using a head of the combined network, a depth map from the features for a scene depicted in the input image and bounding boxes identifying objects in the input image, wherein the head includes multiple sub-heads for each of the multiple scales that perform 3D object detection, 2D object detection, depth estimation, and classification;
training, in a first stage, the combined network by using a supervised depth loss derived from the depth map; and
training, in a second stage, the combined network by using the bounding boxes and ground-truth data to compute a detection loss.

10. The method of claim 9, wherein decoding includes providing, using lateral connections between the backbone and the top-down pathway, the multiple scales of the feature map in addition to an output of a prior level from within the top-down pathway.

11. The method of claim 9, wherein generating the feature map includes generating the feature map at the multiple scales as a feature hierarchy, and
wherein generating the feature map encodes features of the input image to provide a common reference for generating the depth map and the bounding boxes.

12. The method of claim 9, wherein generating the depth map and the bounding boxes includes using the head among separate layers of the top-down pathway at the multiple scales to generate the bounding boxes at the multiple scales and the depth map at one of the multiple scales.

13. The method of claim 9, further comprising:
providing the depth map and the bounding boxes to cause navigation of a device according to the depth map and the bounding boxes.

* * * * *